H. Carrier.
Potato Digger.

No. 91,415. Patented Jan. 15, 1869.

Witnesses

J. T. Carrier
Thos. Houghton

Inventor

Horace Carrier

United States Patent Office.

HORACE CARRIER, OF KIRTLAND, OHIO.

Letters Patent No. 91,415, dated June 15, 1869.

IMPROVEMENT IN POTATO-DIGGER.

The Schedule referred to in these Letters Patent and making part of the same.

*To whom it may concern:*

Be it known that I, HORACE CARRIER, of the town of Kirtland, in the county of Lake, and State of Ohio, have invented a new and useful Improvement in Potato-Diggers; and I hereby declare that the following is a full and exact description thereof, reference being had to the accompanying drawings, and to the letters of reference marked thereon, and making a part of this specification.

My improvement consists in combining a shovel with a drag-fork, endless belt, and separator, in such a manner as to dig potatoes by means of a team of horses or other suitable power, and separate them from the earth covering them, leaving the potatoes upon the surface, to be gathered into baskets or barrels, or other vessels.

In the accompanying drawings—

Figure 1:
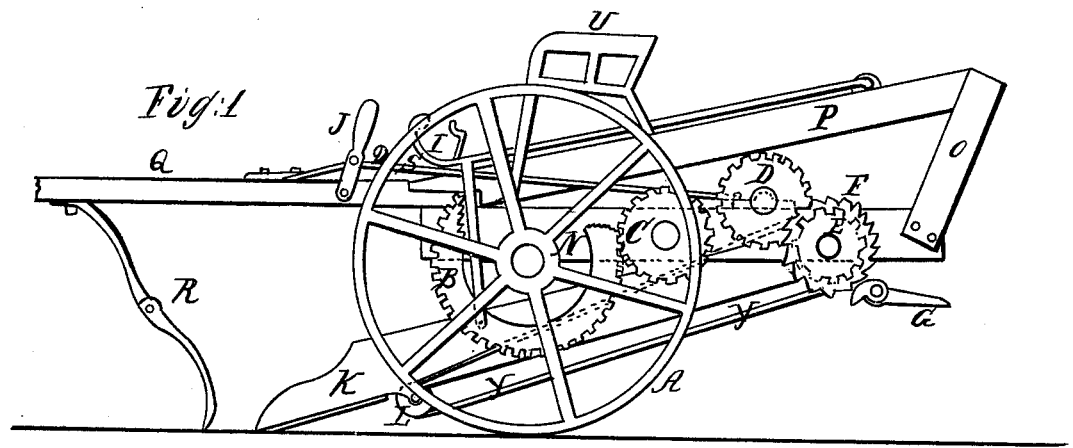
Figure 1 is a side elevation of my potato-digger.

In fig. 1—

A represents one of the driving-wheels used for sustaining and driving the machinery of the digger.

B represents a gear-wheel, attached to the spokes, or arms of the driving-wheel A, by means of which to turn the pinion C.

K represents the shovel.

L represents a cylinder, or pulley, around which passes an endless belt, carried by means of a pulley turned by the pinion E.

Y Y are an endless belt, of the breadth of the shovel K, and is used to convey the earth, potatoes, and their tops from the shovel to the separator G.

I is a lever, by means of which, and the connecting-rod T, the shovel is raised or depressed at the will of the operator.

J is also a lever, by means of which the pinion-wheel D is detached from the cog-wheel C, so as to permit the machine to be moved without operating it.

Q is the neap, and R, the fork, or drag attached thereto, to be used for straightening the vines of the potatoes before the shovel, that they shall not catch upon the edges or sides of the shovel, and impede its working.

U is the seat for the operator while driving or operating the digger.

H is a cam, use for agitating the separator G.

Figure 2:
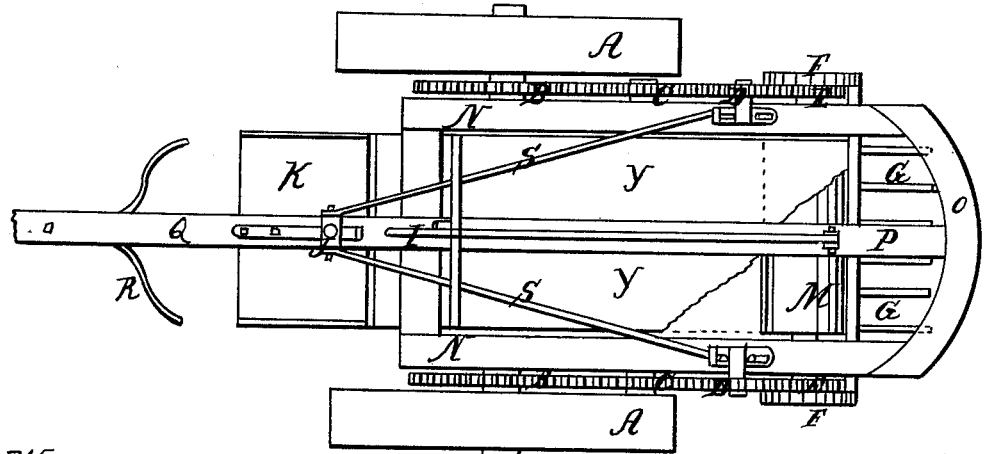
Figure 2 is a top view of the same.

In fig. 2, the same letters represent the same parts of the digger as in fig. 1.

The operation of the digger is as follows:

When the machine is to be used, a team or power is attached thereto. The shovel is adjusted by the lever I and the connecting-rod T, so that it shall penetrate the earth beneath the hill, or row, and underneath the potatoes, gathering them, with their tops and earth, upon the shovel, and projecting the mass back upon the endless belt Y Y, to be transported thereby to the shaker, or separator G, which is arranged as seen in fig. 2.

To prepare the rows of potatoes for the operation of the shovel, the rake, or drag R is attached to the neap, and adjusted so that it shall gather the tops, or vines of the potatoes in front of the shovel, to prevent their impeding its operation.

The endless belt, receiving the potatoes, transports them at once to the separator, where they, passing on, are discharged upon the surface of the earth in the rear.

When moving the digger, without desiring to operate the same, the pinion D is moved out of gear, by means of the lever J and the rods S S, as seen in fig. 2.

Having thus fully described my said improvement, and the method of operating the same, I will proceed to set forth what I claim as my own, and desire to secure by Letters Patent.

The shovel K, endless belt Y Y, separator G, levers I and J, and drag-fork R, combined, arranged, and operating as and for the purpose set forth.

HORACE CARRIER.

Witnesses:
JOEL TIFFANY,
J. T. CARRIER.